United States Patent [19]

Recker

[11] Patent Number: 5,522,669

[45] Date of Patent: Jun. 4, 1996

[54] TORQUE TRANSMITTING COUPLING DEVICE

[76] Inventor: Florian B. Recker, 802 First St., Dyersville, Iowa 52040

[21] Appl. No.: 531,090

[22] Filed: Sep. 20, 1995

Related U.S. Application Data

[63] Continuation of Ser. No. 165,195, Dec. 13, 1993, abandoned.

[51] Int. Cl.$^6$ .................. B25G 3/18; F16B 7/04
[52] U.S. Cl. .................. 403/328; 403/325; 403/326
[58] Field of Search .................. 403/328, 322, 403/325, 359, 316, 317, 318, 327; 172/125

[56] References Cited

U.S. PATENT DOCUMENTS

| | | |
|---|---|---|
| 2,926,034 | 2/1960 | Weaver. |
| 3,747,966 | 7/1973 | Wilkes et al.. |
| 4,289,414 | 9/1981 | Recker. |
| 4,402,626 | 9/1983 | Recker. |
| 4,579,476 | 4/1986 | Post .................. 403/328 X |
| 4,639,162 | 1/1987 | Geisthoff et al. .................. 403/328 X |
| 4,639,163 | 1/1987 | Buthe et al. .................. 403/328 X |
| 4,960,344 | 10/1990 | Geisthoff et al. .................. 403/328 X |

FOREIGN PATENT DOCUMENTS 814030  5/1959  United Kingdom .................. 403/317

*Primary Examiner*—Anthony Knight
*Attorney, Agent, or Firm*—Henderson & Sturm

[57] ABSTRACT

A torque transmitting coupling including a hub, an internally splined opening in the hub being adapted to receive an externally splined shaft. Locking structure in provided for selectively locking the shaft into the opening in the hub, such locking structure being biased to a locked position and selectively movable to an unlocked position. The locking structure includes means for automatically locking the shaft into the hub upon insertion of the shaft into the hub and further includes a structure for allowing unlocking of the shaft from the hub. The locking structure includes a plurality of bores radially disposed in the hub, a locking element slidably disposed in each of the bores and being radially movable from an inner, locking position wherein the elements are engageable within a recess of the shaft to prevent relative axial movement of the hub with respect to the shaft; and, an outer, unlocked position whereby the elements permit relative axial movement of the hub and the shaft. A lock opening mechanism is also provided to hold the locking elements in the unlocked position when the shaft is withdrawn. The locking structure is further prevented from losing its automatic lock-up condition; and the connection of the hub with a safety shield comprises but a pair of shoulders biased into a mating condition.

5 Claims, 4 Drawing Sheets

TORQUE TRANSMITTING COUPLING DEVICE

This is a continuation of application Ser. No. 07/165,195 filed on Dec. 13, 1993 now abandoned.

TECHNICAL FIELD

The present invention relates generally to shaft couplings and more particularly to a shaft coupling for transmitting a torque force from one shaft to another.

BACKGROUND ART

The problem of how to couple one shaft to another for transmitting a torque force is a long standing one. This has particularly been a problem in the farming community wherein the power take-off of an agricultural tractor frequently must be connected and disconnected to utilize one implement and then another. This problem has been solved in the past to one degree or another and one of the most commercially successful of these solutions is a connection of the type disclosed in U.S. Pat. No. 3,747,966 to Wilkes, et al, issued in 1973. The commercial success of the coupling of this Wilkes, et al, patent has been excellent, but even a quick view of the patent discloses many parts which must be made and a considerable number of grooves and holes, all of which lead to additional cost and, to some extent, a complicated operation for use.

To operate the coupler of the Wilkes, et al, patent referred to above, assuming that the drive train connected thereto is desired to be connected to the power take-off shaft of a tractor, the safety guard of the coupler must be pulled rearwardly to overcome the bias of a spring and free the coupling elements to permit the coupler to be placed over the power take-off shaft, and while this rearward pulling is accomplished, the operator must also forwardly pull a very heavy drive train having telescoping parts which also add to the drag which must be overcome; and, once the coupler is placed over the power take-off shaft, then the guard can be released so that the coupling elements engage and lock the coupler to the power take-off shaft of the tractor.

If it happens that the splines of the coupler are not aligned with the splines of the power take-off shaft which happens in a very large percentage of cases, then, in addition to the operation referred to above, a button must be pushed down in the Wilkes, et al, coupler and the guard turned while pushing the button down, until a hole in the coupler housing is engaged. Once this has been done, the entire coupling housing may be rotated at the same time that the guard is being pulled back to keep coupler in an unlocked position; and, at the same time that the entire drive chain is being pulled forward in an opposite direction, whereby the coupler can be aligned with the splines of the shaft to complete the coupler operation as described above.

I have accomplished certain simplifications as disclosed in U.S. Pat. Nos. 4,289,414 issued Sep. 15, 1981; and 4,402,626 issued Sep. 6, 1983; however, such improvements have opened other avenues for further simplification of the parts and operation as disclosed hereinafter.

DISCLOSURE OF THE INVENTION

The present invention therefore comprises a shaft coupling mechanism which overcomes the cumbersome problems of the prior art by providing a coupler which locks the shaft into the housing upon insertion of the shaft into the housing; permits easy disengagement of the shaft from the housing, automatically holding the locking means in the unlocked position upon withdrawal of the shaft; and permits easy rotational adjustment of the internally splined housing for alignment with the external splines of the shaft; the foregoing being accomplished by a minimum of manual operations and adjustments by the user. According to the present invention, the user need only rotate the guard to align the housing with the shaft splines, and then simply pull the housing over the shaft to achieve the desired coupling automatically. The device furthermore provides a novel design for a follower and spring unit for automatically returning the coupler device to an unlocked or open-cocked position upon separation of the power shaft hub and the PTO shaft.

Additionally, the structural and operational relationships between the collar or coupler guard and the retaining ring are changed to provide for releasably locking the guard into the open cocked position to prevent its being moved out of same by operation of the retaining ring such as to negate the automatic lock-up feature of this type coupler device. This also provides the operator with a visual check on the coupler device being in the open cocked position when necessary. Further, the guard is improved as to its ability to be manipulated.

Still additionally, the coupler device is modified such that the means acting between the power shaft hub and the retaining ring fulfills a dual function in first biasing the retaining ring toward a position wherein elements prevent relative movement between the PTO shaft and the power shaft hub, and secondly maintaining the power shaft hub and a safety shield in axially stationary but radially movable condition. This is accomplished in part by certain elements of the shield and power shaft hub, and by the provision of inner and outer, mating shoulders formed respectively on the shield adjacent the coupler device and the power shaft hub.

It is an object of the present invention to provide an improved coupling device for transmitting torque force from one shaft to another.

Another object of the prevent invention to provide a coupling device improved by releasably locking together the coupler guard and retaining ring to enhance the function, reliability and safety of the coupler device.

Still another object of this invention is to provide an improved and simplified structure for maintaining a safety shield in freely rotatable engagement with the power shaft.

A still further object is the provision of an integrally formed guard and adjustment mechanism.

Another object of the invention is to provide an improved coupling device which is economical to manufacture.

A further object of the invention is to provide an improved coupling device which is simple and dependable to use.

Still another object of the invention is to improve and simplify a coupling apparatus which has been proven to be dependable and is commercially successful.

BRIEF DESCRIPTION OF THE DRAWINGS

These and other attributes of the invention will become more clear upon making a thorough review and study of the following description of a preferred embodiment, particularly when reviewed in conjunction with the drawings, wherein.

BEST MODE FOR CARRYING OUT THE INVENTION

Figure 1:
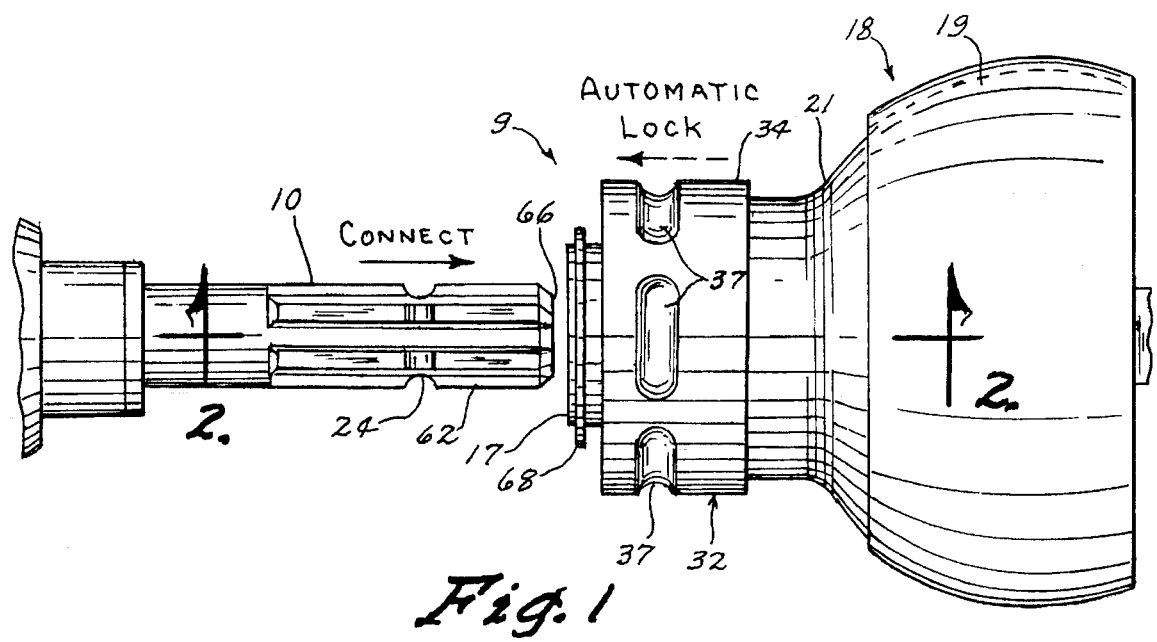
FIG 1 is a side-elevational view of the torque transmitting coupling device of this invention in preparation for insertion on the externally splined shaft of the power take-off shaft.

Referring first to FIG. 1 of the drawings, the shaft coupling mechanism of the invention, indicated generally at (9), includes an externally splined shaft (10) which may, for example, comprise the power-take-off shaft of an agricultural tractor, and a mating, internally splined power transmission shaft (11) of the type conventionally employed to drivingly connect a PTO shaft with a trailing or rear mounted implement. To accommodate relative movement between the tractor and the implement, the shaft (11) is provided with a universal joint (12) adjacent to its forward end, the joint (12) comprising a pair of pivotally interconnected front and rear yoke members (13) and (14), respectively. The rear yoke member (14), only partly shown, is non-rotatably fixed to the forward end of an elongated shaft (not shown) while the front yoke member (13) has a forwardly extending hollow hub portion (17) integral with its forward end and internally splined to axially receive the shaft (10).

To guard against accidental contact with the rotating power shaft (12), the latter is provided with safety shielding indicated generally at (18), and of the type disclosed in U.S. Pat. No. 3,747,966, which discloses the provision of a three-section spherical shield, for the universal joint (12), only two sections of which are shown partially herein, the intermediate member (19), and the forward closure member (21). Further description of the closure member (21) is provided hereinafter.

Figure 2:
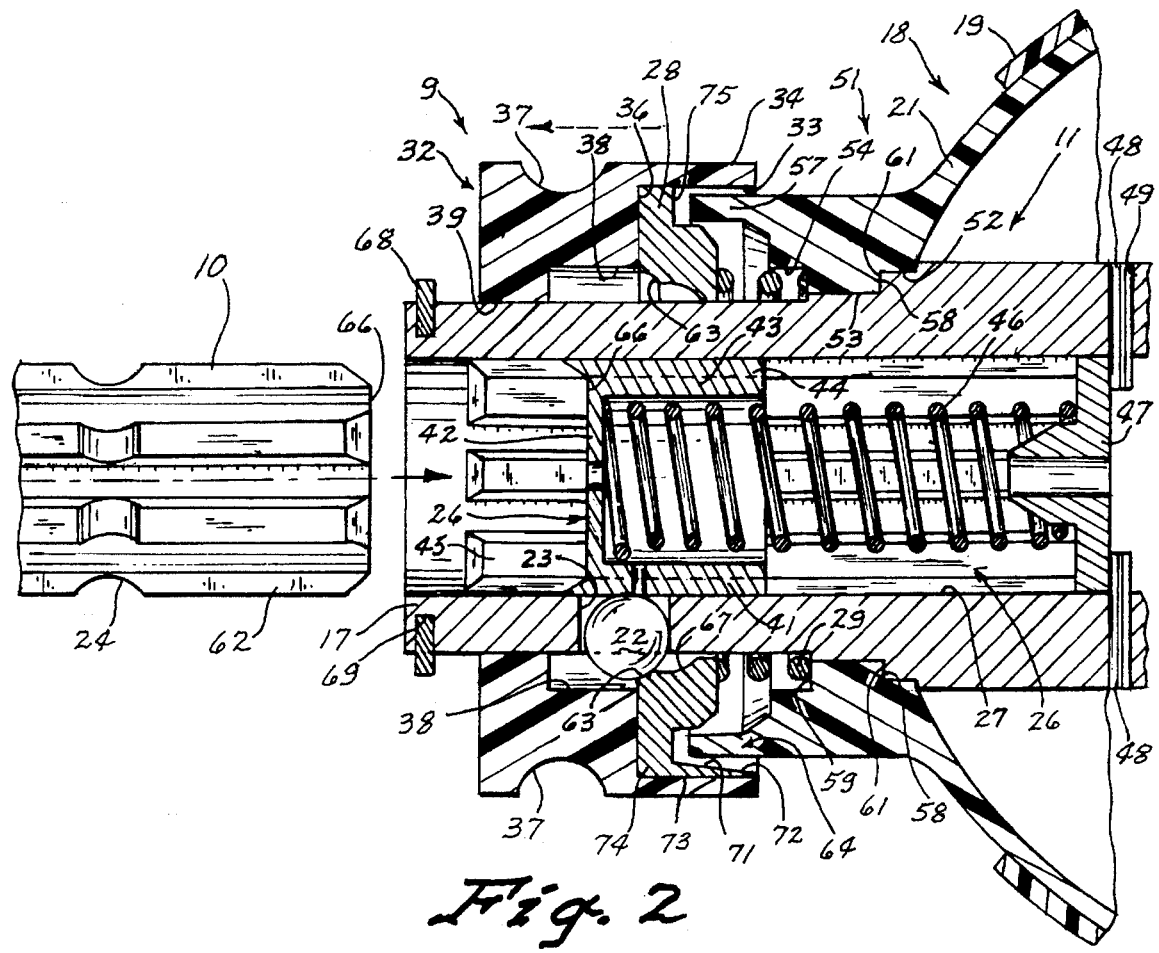
FIG. 2 is an enlarged sectional view of the coupling device in the FIG. 1 position wherein the coupling device is locked into an open position for engagement of the externally splined PTO shaft with the internally splined hub of a power transmission shaft of an implement to be powered by the PTO shaft.
Figure 3:
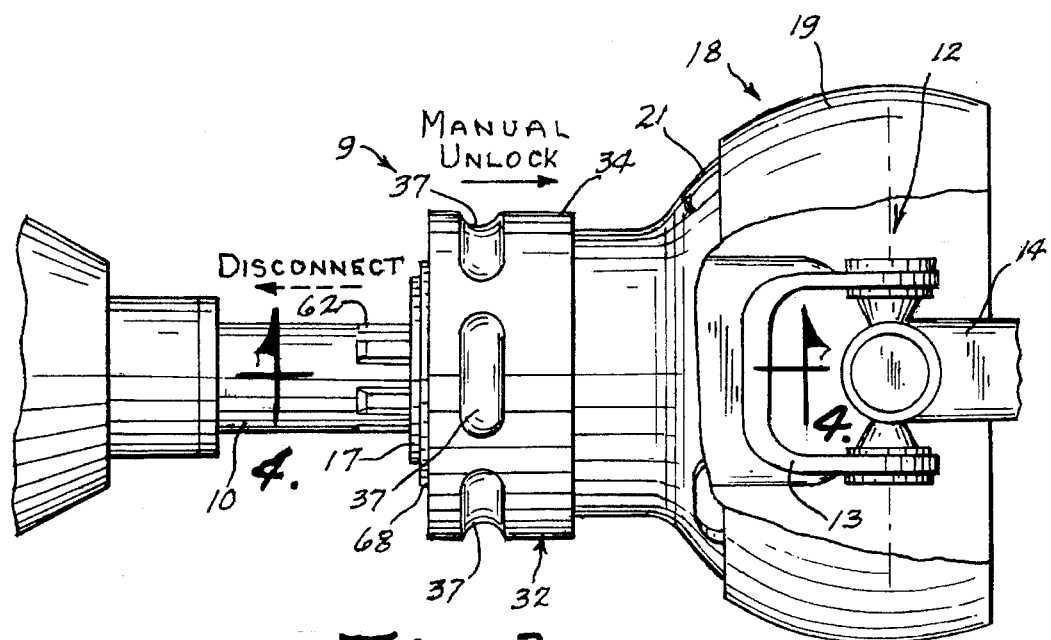
FIG. 3 is a view similar to FIG. 1, but with the coupler device of this invention effecting a releasable locked position of the PTO and power shafts.

The mechanism employed to axially lock the power shaft (11) on the PTO shaft (10) comprises three locking elements or balls (22) received for radial movement in three equally spaced apertures (23) extending through the wall of the hub (17). The balls (22) are movable in the apertures (23) between a radially outward, unlocking position wherein the hub (17) is free to move axially on the shaft (10) (see FIG. 2), and a radial inward locking position wherein the balls (22) are operative to engage a circumferential recess (24) formed near the terminal end of the shaft (10) and thereby axially lock the hub (17) onto the shaft (10) (see FIG. 4). As best shown in FIG. 2, the balls (22) are prevented from falling through the apertures (23) when the hub (17) is removed from the PTO shaft (10) by the provision of a shaft follower unit (26) axially, movably mounted within the bore (27) of the power transmission shaft hub (17). The balls (22) are maintained in their inward, locking position by means of a retaining ring (28) axially slidable on the periphery (40) of the hub portion (17) between a first position shown in FIG. 4 in which the ring (28) surrounds the balls (22) and prevents their radial outward movement, and a second position shown in FIG. 2, in which the balls (22) are each locked, respectively into a depression (38) described more in detail hereinafter formed within a guard (32), the ring (28) engaged with the balls (22) but spaced sufficiently rearwardly from the balls (22) to enable their outward radial movement to the non-locking, open-cocked position. A coil spring (29) acts between the rear side of the retaining ring (28) and an outer shoulder (59) (FIG. 2) formed on an inner bore of the closure member (21) to bias the former toward its first position.

As part of the automatic locking mechanism, a circular collar or guard (32) is provided having a first bore (33) formed within an annular flange (34) of the guard (32); and leaving an inner face (36) formed within the bore (33). For the purpose of easy manipulation and operation of the guard (33), arcuately spaced depressions (37) (FIGS. 1 and 2) are formed in the exterior surface of the guard in an annular manner. Additionally, arcuately spaced, inner depressions (38) (FIG. 6) are formed within a second bore (39) (FIG. 2), the inner depressions (38) each capable of receiving one of the three locking balls (22) (see FIG. 2) as described hereinbefore. The bore (39) slidingly receives the outer circumferential surface (40) of the hub (17).

The shaft follower unit (26) (FIG. 2) includes a cup-shaped follower (41) having a base (42) and an annular side wall (43), with external splines (44) adapting the follower (41) to slide axially within the internal splines (45) of the hub (17). The follower (41) is biased forwardly by a coil spring (46) mounted between the base (42) of the follower (41) and a backstop (47) (FIG. 2) secured within the bore (27) by a plurality of pins (48) inserted through openings (49) formed in the hub (17).

Figure 4:
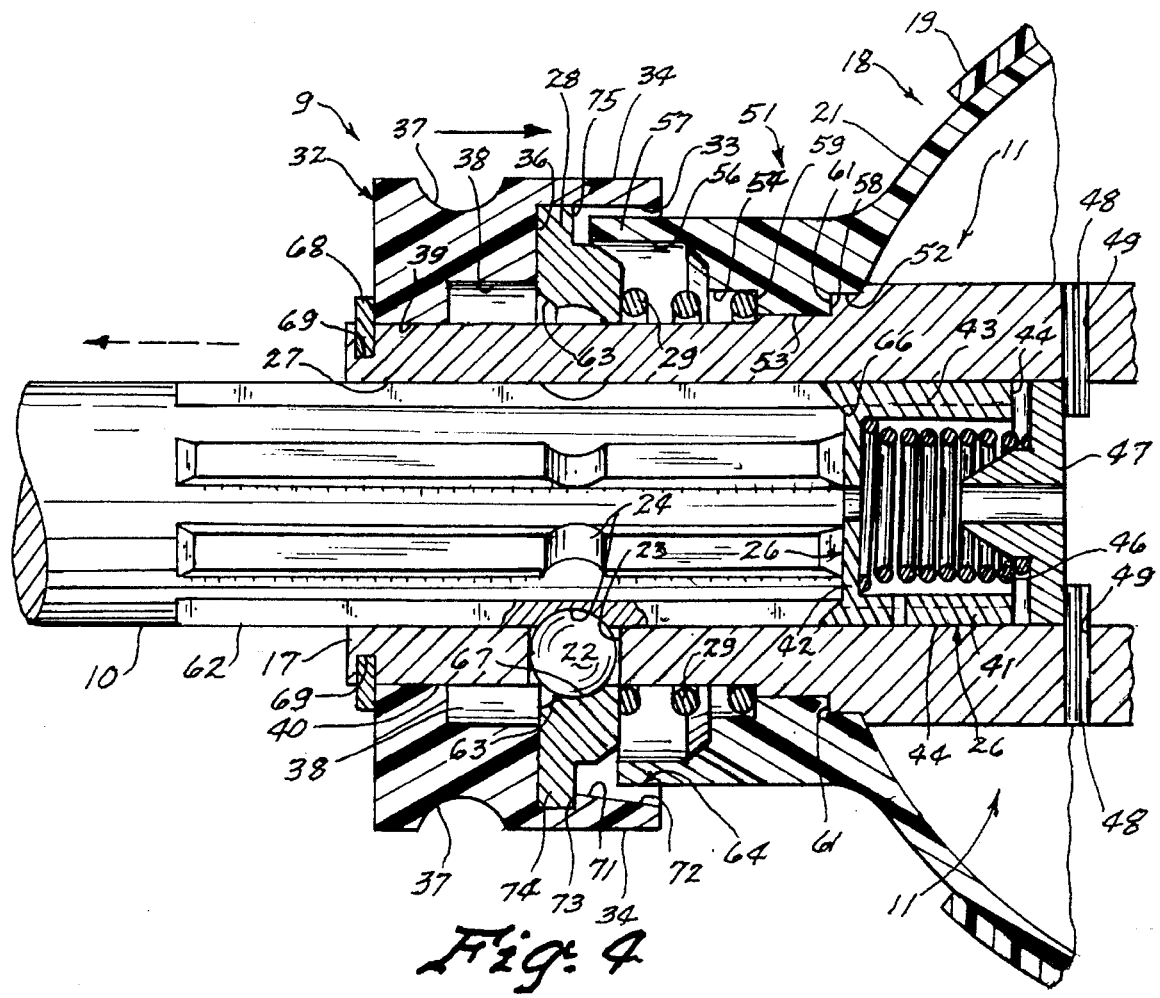
FIG. 4 is a sectional view similar to FIG. 2, and showing the coupler device element moved to a closed position effectively locking the PTO and power shafts in a spline-engaged, power transmitting position and preventing axial movement therebetween.
Figure 5:
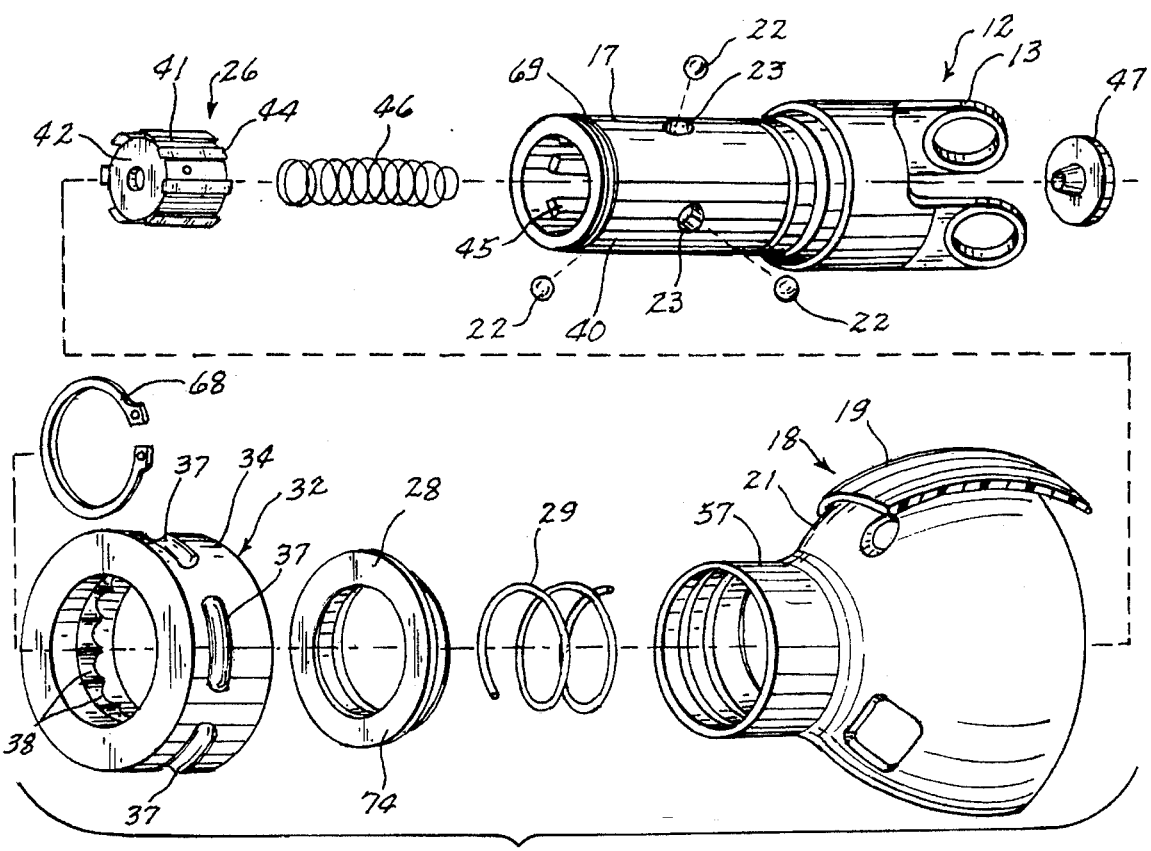
FIG. 5 is a perspective, exploded view of the element of the coupler device of this invention.

Referring to FIGS. 4 and 5, it will be seen that the forward, annular end (51) of the shield closure member (21) includes an inner bore (52) a second bore (53) of a lesser diameter, a third bore (54), and a forward outer bore (56) forming thereby an annular flange (57). At the inner and outer ends, respectively, of the second bore (53), shoulders (58) and (59) (FIG. 2) are formed. Shoulder (58) mates with shoulder (61) formed externally on the hub portion (17) of the power transmission shaft (11), such as to retain the closure member (21) in a mating, but radially movable condition with the shaft portion (16) due to the bias of the spring (29) engaging at its forward end with the retaining ring (28) and at its rearward end with the shoulder (59) of the shield closure member (21).

In operation of the coupler device, to insert the hub (17) onto the shaft (10), rather than to physically force the guard (32) rearwardly against the bias of the spring (29) as in certain prior art embodiments, it will be noted in FIG. 2 that the coupler device is in an automatically locked, open position. In this position, the locking elements (22) are held in their radial outer positions (FIG. 2) by the follower (41), the locking elements engaging a forward shoulder (63) of the retaining ring (28), and each of the three locking balls (22) being lodged within one of the inner depressions (38) of the guard (32). The retaining ring (28) is locked into its position due to its biased engagement with the locking balls

Figure 6:
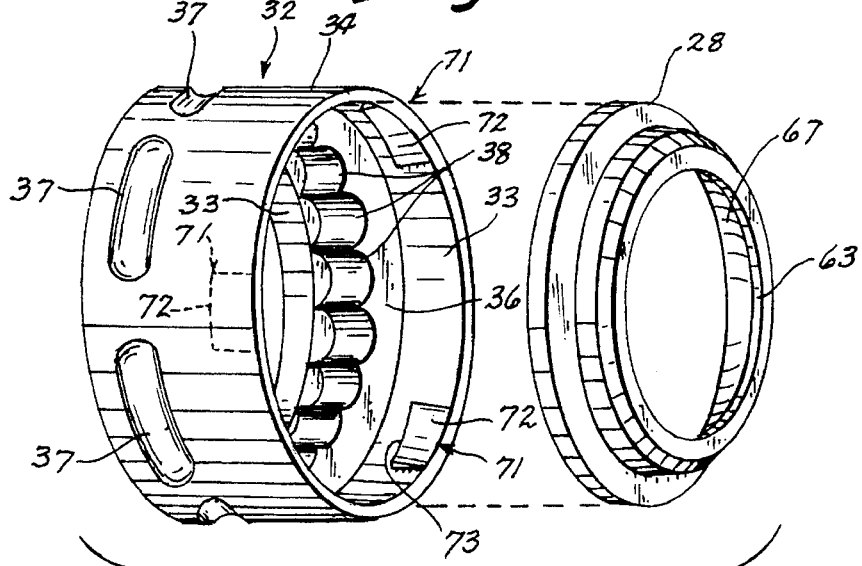
FIG. 6 is an enlarged perspective view of the coupler guard and the retaining ring unit shown in exploded form.

(22) as by the spring (29); and the guard (32) is held against the retaining ring (28) by a locking unit indicated generally at (64) (FIGS. 2 and 6). As explained further hereinafter, in this locked condition of the guard (32) and the retaining ring (28), the guard (32) is prevented from moving axially, forwardly away from the retaining ring (28) to destroy the automatic locked, open condition of the coupler. Further, both the retaining ring (28) and guard (32) may freely spin about the hub (17) for safety purposes such as to prevent clothing or the like from being caught at any time within the coupler. It will further be noted in this condition of the coupler that the annular flange (57) of the closure member (21) extends within the first bore (33) of the guard (32), the elements overlapping again for safety purposes.

With the coupler in the cocked-open condition of FIG. 2, upon insertion of the coupler onto the externally splined PTO shaft (10), should the splines (62) of the shaft (10) not align with the internal splines (45) of the hub (17), rotation of the guard (32) and the retaining ring (38) as a unit will effect via the locking balls (22) sufficient rotation of the hub portion (17) such that the splines of the shaft (10) in hub (17) align. Then, further insertion of the hub (17) onto the stationary PTO shaft (10) effects engagement between the rear face (66) of the shaft (10) with the base (42) of the follower (41), further insertion effecting a compression of the follower spring (46) (FIG. 4) until the annular recess (24) of the shaft (10) is aligned with the locking balls (22). At this point, the forward bias of the retaining ring (28) by the spring (29) forces the balls (22) from their outer, unlocking position radially, inwardly and into the recess (24) and into their inner, locking position such that the hub (17) and its shaft (11) is now in a locked condition with the PTO shaft (10) by automatic action of the coupler device (9). It will be noted in FIG. 4 that the locking balls (22) are now nested within an annular second shoulder (67) of the retaining ring (28). Forward movement of the retaining ring (28) and the guard (32) as a unit in the locked condition of the coupler device (9) is limited by engagement of the guard (32) with a removable ring (68) engageable within a circumferential groove (69) formed in the forward end of the hub (17). The guard (32) and retaining ring (38) in this locked condition of the coupler device (9), present a free spinning relationship to both the PTO shaft (10) and the hub portion (17).

To separate the PTO shaft (10) from the hub portion (17), the coupler device (9) is moved rearwardly as indicated by the arrow in FIG. 4, such that the guard (32) is grasped and moved rearwardly toward the shield (18) and against the bias of the spring (29) until the locking elements (22) are released from engagement with the retaining ring (28) and located axially opposite the inner depressions (38) of the guard (32) at which time the bias of the follower spring (46) is sufficient to move the follower (41) forwardly against the PTO shaft (10), enabling the power transmission shaft (11) to be withdrawn and separated from the PTO shaft (10). As this is accomplished, the follower (41) moves forwardly within the bore (27) of the hub (17), with the outer circumferential surface of the follower (41) engaging the inner surfaces of the locking balls (22), with the follower (41) being retained in its position of FIG. 2, holding the locking balls (22) in their outer, unlocked but automatically cocked-open condition, ready for the next reinsertion with the PTO shaft (10). The coil spring (46) of the follower unit (26) has its ends engaged in one manner or another with the follower (41) and the backstop (47) such as to limit the forward movement of the follower (41) to the position of FIG. 2.

To accomplish the locking together of the retaining ring (28) and the guard (32), the locking unit (64) comprises a plurality, three in this instance, of lands (71) (FIGS. 2 and 6) formed on the surface of the first bore (33) in arcuately spaced relation. Each land (71) is the same, having a forwardly and inwardly extended ramp (72) ending in a shoulder (73) spaced from the face (36) of the bore (33) a distance equal the width of the retaining ring outer circumferential edge (74). In this manner the ring (28) can be snapped into place (FIG. 2) between the face (36) and shoulder (73) thus effectively locking the ring (28) and guard (32) together.

Figure 7:
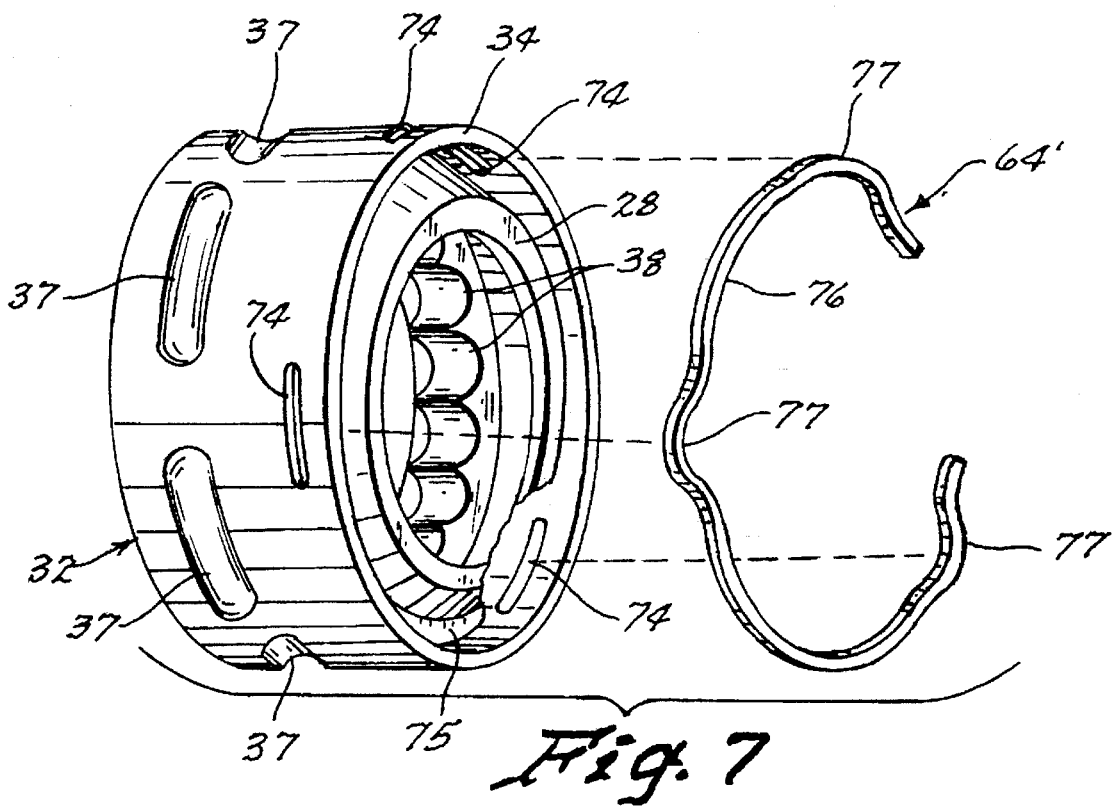
FIG. 7 is a view similar to FIG. 6 and showing second embodiment of the coupler guard and retaining ring unit.

A second embodiment of the locking unit (64') is illustrated in FIG. 7, wherein rather than providing the lands (71), a plurality of arcuately spaced slots (74) are formed in the guard flange (34) behind, in effect, the ring (28) when located against the guard (32), and with a snap ring (76) having outwardly protruding portions (77) capable of protruding through the slots (74), respectively, upon the snap ring (76) being inserted within the bore (33) and up against the retaining ring forward face (75). The snap ring (76) is removable.

Figure 8:
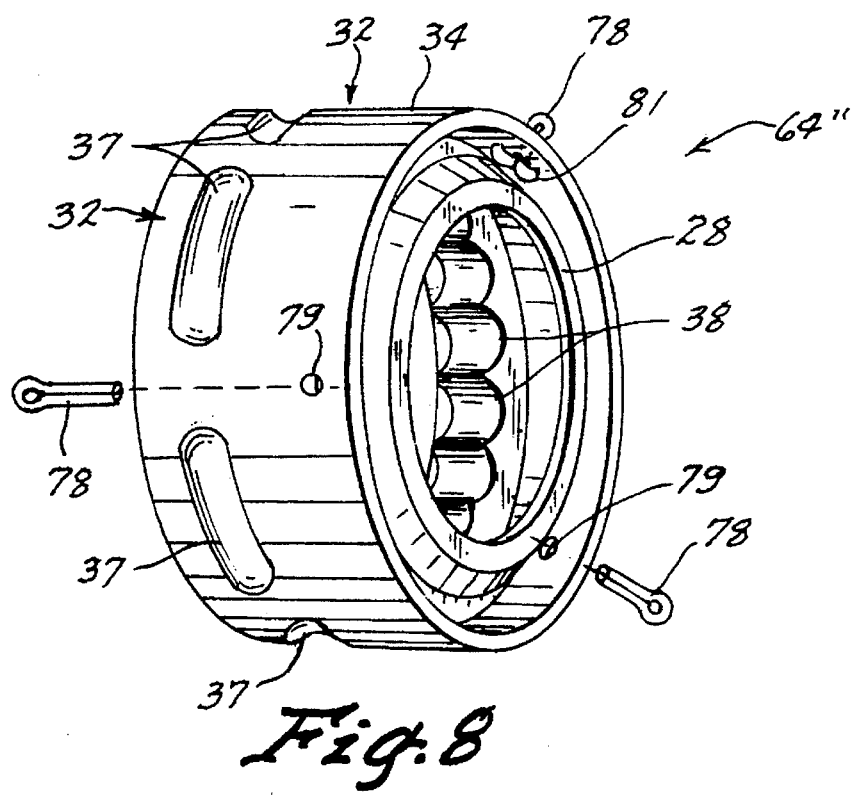
FIG. 8 is a view similar to FIG. 6 and showing a third embodiment of the guard and retaining ring unit.

A third embodiment (64") (FIG. 8) comprises a plurality of split rivets (78) inserted through openings (79) formed in the flange (34), with the inner ends (81) folded back so as to engage and hold the retaining ring (28) in place against the guard (32). The split rivets (78) are removable.

Accordingly it is believed clear that the above described embodiment, with alternative arrangements does indeed accomplish all of the objects described hereinbefore. Obviously, many modifications and variations of the present invention are possible in light of the above teachings. Although, for example, the retaining ring (28) is tempered steel, with the guard (32) being of a plastic nature, these and other elements can be constructed in many different ways and of many different materials while still fulfilling their functions as to the invention. It is therefore to be understood that, within the scope of the appended claims, the invention may be practiced otherwise than as specifically described.

I claim:

1. In a mechanism for coupling a first shaft having a circumferentially formed recess near its terminal end to a second hollow shaft adapted to axially receive said first shaft, the mechanism including a plurality of locking elements circumferentially spaced about and within said second shaft and radially movable between an inner, locking position wherein said elements are engageable with the recess and operable thereby to prevent relative axial movement between said first and second shafts, and an outer, unlocking position wherein said elements are disengaged from the recess to permit such relative axial movement, follower means mounted within said second shaft and operable between an outer position unengaged with said first shaft wherein said locking elements are moved radially outwardly from their inner, locking position by said follower means to their outer, unlocking position, said follower means having an inner position engaged with said second shaft and wherein said locking elements are in their outer, unlocking position, the improvement comprising:

a circular retaining member axially slidable on said second shaft between a first position wherein it is operable to maintain said locking elements in their locking position, and a second position wherein it permits radial movement of said locking elements to their unlocking position;

means encircling said second shaft for biasing said retaining member axially toward its first position;

a guard encircling said second shaft and said retaining member and releasably connected directly to the latter for axial and rotational movement therewith;

a shield encircling said second shaft and free to rotate relative thereto, said shield having a terminal end extending between said guard and said second shaft; and with said biasing means comprising a coil spring encircling said second shaft and extended between said retaining member and said shield to bias said retaining member toward its first position and to bias said shield toward mating engagement with said second shaft, with said shield remaining free to spin about said second shaft.

2. The invention of claim 1, and further wherein said guard has an inner, annular bore formed therein within a circular flange, with a plurality of arcuately spaced lands formed on said bore for receiving and locking into place said retaining member within said flange.

3. The invention of claim 2, wherein said lands each extended axially and radially inwardly to form a shoulder having an inner end spaced axially from the inner end of said bore whereby to lockingly receive within said space at least a portion of said retaining member.

4. The invention of claim 1, and further with said guard having an inner, annular bore formed therein within a circular flange, a plurality of arcuately spaced openings formed in said flange, said retaining ring disposed within said flange, and a snap ring adapted to engage said retaining ring with portions thereof extended through said openings.

5. The invention of claim 1, with said guard having an inner, annular bore formed therein within a circular flange, a plurality of arcuately spaced openings formed in said flange, said retaining ring disposed within said flange, and a fastener inserted through each said opening and into engagement with said retaining ring for maintaining said retaining ring in engagement with said guard at all times.

* * * * *